June 21, 1955 — M. E. QUYLE — 2,711,049

FISH LURE

Filed Oct. 25, 1952

INVENTOR
Martin E. Quyle
BY Webster & Webster
ATTORNEYS

United States Patent Office 2,711,049
Patented June 21, 1955

2,711,049

FISH LURE

Martin E. Quyle, Stockton, Calif.

Application October 25, 1952, Serial No. 316,833

4 Claims. (Cl. 43—42.2)

This invention relates to, and it is a major object to provide, a novel fish lure.

Another important object of the invention is to provide a fish lure of a type adapted for trolling or casting; the lure including a water actuated, spinning blade which has close resemblance to a minnow or other bait fish as the lure is drawn through the water with such blade turning rapidly.

An additional object of the invention is to provide a fish lure, of spinning blade type, wherein the blade is of novel configuration; such blade including an impeller flange which serves a dual purpose; firstly, to assure of effective and rapid spinning of the blade, and secondly to cause the blade to have a more fish-like appearance as it so spins.

A further object of the invention is to provide a fish lure which, when in use, does not tend to snag on objects which it may strike against; this for the reason that the spinning blade tends to maintain the trailing hook in a clearance position with respect to any such objects.

A still further object of the invention is to provide a lure which is highly attractive to fish, and functions without tendency to cause misses when a fish strikes at the lure.

It is also an object of the invention to provide a fish lure which is designed for ease and economy of manufacture.

Still another object of the invention is to provide a practical and reliable fish lure, and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the fish lure comprises an elongated helical spinning blade 1 of slightly less than one full spiral turn; such blade being of substantially constant width throughout except at the ends or tips, which are rounded; the forward tip being indicated at 2, and the rearward tip being indicated at 3.

Figure 1:
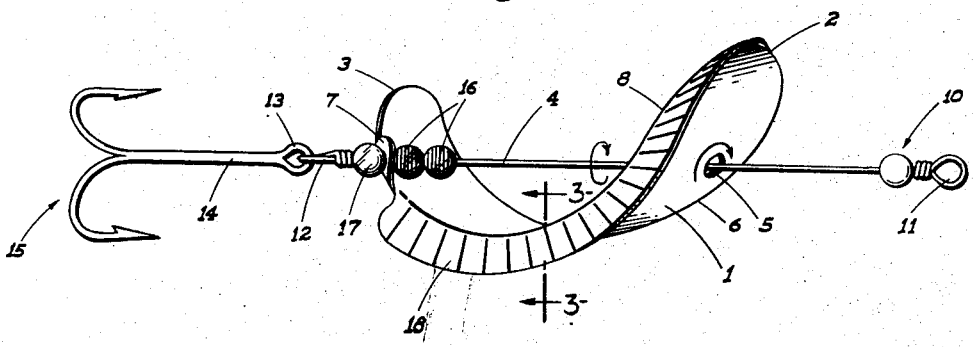
Fig. 1 is a side elevation of the lure.

The spinning blade 1 is carried on a length of spring steel wire 4; such wire passing at the forward portion of the blade through a hole 5 therein adjacent its trailing edge 6 but short of the forward tip 2. At the rearward portion of the blade 1 the length of spring steel wire 4 passes through an ear 7 turned in the direction of rotation from the leading edge 8 of said blade adjacent but short of its rear tip 3. The blade is shaped, twisted and mounted so that upon wire 4 being pulled forwardly, the blade will rotate in the direction indicated by the arrow in Fig. 1, thereby making the longitudinal edge 8 the leading edge of the spinner.

Figure 2:
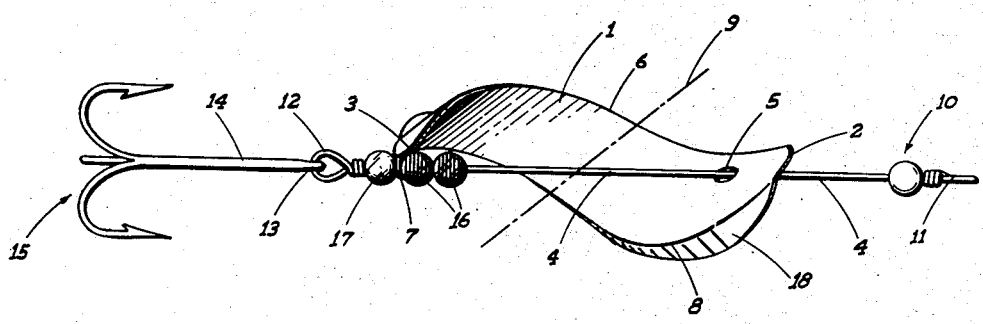
Fig. 2 is a similar view, but shows the spinning blade rotated approximately a half turn.
Figure 3:
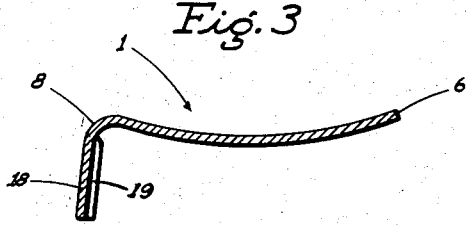
Fig. 3 is an enlarged fragmentary cross section on line 3—3 of Fig. 1.
Figure 4:
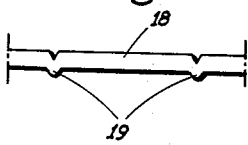
Fig. 4 is a fragmentary outer edge view of the impeller flange showing the transverse ribs.

As so arranged in connection with the blade 1, the length of wire 4 extends through such blade in diagonally intersecting relation to the transverse blade axis; the latter being shown by dotted line, indicated at 9 in Fig. 2.

At its forward end the length of spring steel wire 4 is connected to a swivel unit 10 having an eye 11 for connection to a line or leader (not shown). At its rear end the length of spring steel wire 4 is formed as a connection loop 12 which extends through the eye 13 on the forward end of the shank 14 of a hook 15; the hook here being shown as of treble type.

A pair of beads 16, preferably red in color, surround the wire 4 ahead of the ear 7, while a similar bead 17 surrounds the wire between said ear and the connection loop 12.

The elongated helical spinning blade 1 is formed, along its leading edge 8, from the tip 2 to adjacent the ear 7 with a longitudinal impeller flange 18 bent back contra to the direction of rotation of the blade; the flange 18 being relatively narrow as compared to the width of the blade 1.

As so formed, the longitudinal impeller flange 18 has a helical configuration similar to the blade 1, but at substantially a right angle thereto.

The primary purpose of the flange 18 is to aid in the rotation or spinning of the blade 1 as the lure is drawn through the water. The water as it passes progressively contacts the face of the blade 1 also impinges against the face of the impeller flange 18, and causes said blade to turn rapidly with a spiraling or screw action in the water about the length of spring steel wire 4.

Additionally, the flange 18, as the blade 1 spins, serves to aid in the appearance of the spinning blade as a live minnow or other bait fish, which appearance is enhanced by a multiplicity of transverse ribs 19 struck outwardly from said flange 18 in spaced relation therealong. The blade 1, the flange 18, and the included ribs 19 are highly polished, being of chrome or brass finish.

As the blade 1, with the flange 18, spins about the length of wire 4, not only does such blade and flange resemble a live bait fish, but an attractive flashing, from the reflective surfaces, occurs; the light reflection from the transverse ribs 19 causing a visual effect of scales on the simulation, which the device produces, of a live bait fish.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a fish lure which includes a length of wire connected between a forward eye and a trailing hook; a helical spinning blade adapted to extend about the wire between said eye and hook, the blade having longitudinally spaced openings through which the wire extends and a leading and a trailing longitudinal edge, and an impeller flange extending along the leading edge of the blade for substantially its full length and projecting therefrom contra to the direction of rotation.

2. In a fish lure which includes a length of wire connected between a forward eye and a trailing hook; a helical spinning blade adapted to extend about the wire between said eye and hook, said blade being adapted to spin about the wire in a fixed predetermined direction, the blade having a leading and a trailing edge and longitudinally spaced front and rear holes adjacent but short of the corresponding ends of the blade, the forward hole being adjacent the trailing edge and the rear hole adjacent the leading edge, the wire extending through said holes, and an impeller flange extending along the leading edge of the blade and projecting therefrom contra to the direction of rotation.

3. In a fish lure which includes a hook and a swivel eye longitudinally spaced from the hook and adapted for connection to a line, a helical spinner blade adapted to be disposed between and operatively connected to the hook and eye for rotation relative thereto in a fixed direction as the lure is drawn through the water, and having a continuous impeller flange extending along the leading edge of the blade and projecting therefrom contra to the direction of rotation of the blade.

4. A fish lure comprising, a length of wire having a forward eye and a connection for a trailing hook, an elongated relatively long-pitch helical blade less than one full turn in extent and having a longitudinal leading edge and an opposed longitudinal trailing edge, and an ear projecting in the direction of rotation from said leading edge of the blade adjacent the rear end thereof and having a hole therethrough; the wire projecting through the hole in the ear and a hole in the blade, said blade having the hole therein adjacent the trailing edge thereof toward its forward end.

References Cited in the file of this patent

UNITED STATES PATENTS

| | | |
|---|---|---|
| D. 105,113 | Knapp | June 29, 1937 |
| 849,036 | Zimmerman | Apr. 2, 1907 |
| 998,238 | Dineen | July 18, 1911 |
| 1,530,343 | Bayer | Mar. 17, 1925 |
| 1,617,318 | Brown | Feb. 5, 1927 |
| 1,627,637 | Dahlquist | May 10, 1927 |
| 2,497,807 | Wood | Feb. 14, 1950 |